United States Patent
Nakano et al.

(10) Patent No.: US 9,979,170 B1
(45) Date of Patent: May 22, 2018

(54) ELECTRICAL CONNECTION BOX AND WIRE HARNESS

(71) Applicant: Yazaki Corporation, Tokyo (JP)

(72) Inventors: Ryo Nakano, Shizuoka (JP); Yukihiro Koyama, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days. days.

(21) Appl. No.: 15/834,368

(22) Filed: Dec. 7, 2017

(30) Foreign Application Priority Data

Feb. 14, 2017 (JP) .................................. 2017-024880

(51) Int. Cl.
| | |
|---|---|
| *B60R 16/02* | (2006.01) |
| *H02G 3/08* | (2006.01) |
| *H01B 7/00* | (2006.01) |
| *B60R 16/023* | (2006.01) |

(52) U.S. Cl.
CPC ......... *H02G 3/083* (2013.01); *B60R 16/0239* (2013.01); *H01B 7/0045* (2013.01)

(58) Field of Classification Search
CPC .............................................. B60R 16/0239
See application file for complete search history.

(56) References Cited

U.S. PATENT DOCUMENTS

| | | | | |
|---|---|---|---|---|
| 5,671,802 A | * | 9/1997 | Rogers | B60R 16/0239 123/198 E |
| 6,052,283 A | * | 4/2000 | Kawakita | B60R 16/0239 361/695 |
| 6,121,548 A | * | 9/2000 | Matsuoka | B60R 16/0239 174/59 |
| 6,176,746 B1 | * | 1/2001 | Morello | B60R 16/0239 16/232 |
| 9,333,868 B2 | * | 5/2016 | Uchida | B60R 16/0239 |
| 2003/0231470 A1 | * | 12/2003 | Frenzel | B60R 16/0239 361/715 |

FOREIGN PATENT DOCUMENTS

JP      2003-209914 A     7/2003

* cited by examiner

*Primary Examiner* — Hung V Ngo
(74) *Attorney, Agent, or Firm* — Sughrue Mion, PLLC

(57) ABSTRACT

An electrical connection box applied to a wire harness includes a housing body and a covering member. The covering member includes a lid portion capable of closing an opening of the housing body, a holding portion formed to protrude from the lid portion, and fits to the opening and holds an exterior material between the holding portion and the housing body, a supporting portion serving as a rotation fulcrum of the lid portion with respect to the housing portion, an extension portion connects the lid portion and the supporting portion such that the holding portion is at a position apart from the supporting portion, and a plurality of engagement portions engaged with the housing body on both sides of the holding portion in a direction in which the extension portion connects the lid portion and the supporting portion.

4 Claims, 6 Drawing Sheets

ELECTRICAL CONNECTION BOX AND WIRE HARNESS

CROSS-REFERENCE TO RELATED APPLICATION(S)

The present application claims priority to and incorporates by reference the entire contents of Japanese Patent Application No. 2017-024880 filed in Japan on Feb. 14, 2017.

BACKGROUND OF THE INVENTION

1. Field of the Invention

The present invention relates to an electrical connection box and a wire harness.

2. Description of the Related Art

Japanese Patent Application Laid-open No. 2003-209914 discloses an electrical wiring block that houses a plurality of electronic components such that the electronic components can be wired to one another in its block body as an example of conventional electrical connection boxes applied to wire harnesses mounted on vehicles.

In the electrical wiring block described in Japanese Patent Application Laid-open No. 2003-209914, an opening formed on a housing is covered by a covering member supported to the housing in a rotatable manner, for example, in some cases. In such cases, the electrical wiring block is required to allow the covering member to appropriately cover the opening in a state where an exterior material of a routing material is held between the housing and the covering member, for example.

SUMMARY OF THE INVENTION

In view of the above, the invention is made and aims to provide an electrical connection box and a wire harness that allow a covering member to appropriately cover an opening.

In order to achieve the above mentioned object, an electrical connection box according to one aspect of the present invention includes a housing body including: a wall forming a housing space housing therein an electronic component; and an opening formed on the wall and communicating inside and outside the housing space; and a covering member including: a lid portion capable of closing the opening; a holding portion that is formed to protrude from the lid portion, and, in a closed state where the lid portion closes the opening, fits to the opening and holds, between the holding portion and the housing body, an exterior material of a routing material electrically connected to the electronic component; a supporting portion serving as a rotation fulcrum of the lid portion with respect to the housing body; an extension portion that is interposed between the lid portion and the supporting portion and connects the lid portion and the supporting portion such that the holding portion is at a position apart from the supporting portion; and a plurality of engagement portions engaged with the housing body on both sides of the holding portion in a connection direction in which the extension portion connects the lid portion and the supporting portion.

According to another aspect of the present invention, in the electrical connection box, it is possible to configure that the engagement portions include an inside engagement portion positioned on the supporting portion side of the holding portion in the connection direction, the inside engagement portion has an engagement claw portion that is formed to protrude in a protrusion direction of the holding portion, and is engaged with the wall, and the engagement claw portion has a first tapered surface that is provided at an end portion thereof on the supporting portion side in the connection direction and is slanted in the connection direction, and a second tapered surface that is provided at an end portion thereof on a front end side in the protrusion direction and is slanted in the protrusion direction.

According to still another aspect of the present invention, in the electrical connection box, it is possible to configure that the extension portion faces the wall in the closed state where the lid portion closes the opening, and the inside engagement portion is provided to the extension portion.

In order to achieve the above mentioned object, a wire harness according to still another aspect of the present invention includes a conductive routing material; an exterior material externally covering the routing material; and an electrical connection box electrically connected to the routing material, wherein the electrical connection box includes: a housing body including: a wall forming a housing space housing therein an electronic component electrically connected to the routing material; and an opening formed on the wall and communicating inside and outside the housing space; and a covering member including: a lid portion capable of closing the opening; a holding portion that is formed to protrude from the lid portion, and, in a closed state where the lid portion closes the opening, fits to the opening and holds the exterior material between the holding portion and the housing body; a supporting portion serving as a rotation fulcrum of the lid portion with respect to the housing body; an extension portion that is interposed between the lid portion and the supporting portion and connects the lid portion and the supporting portion such that the holding portion is at a position apart from the supporting portion; and a plurality of engagement portions engaged with the housing body on both sides of the holding portion in a connection direction in which the extension portion connects the lid portion and the supporting portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes an embodiment according to the invention in detail with reference to the accompanying drawings. The embodiment does not limit the invention. The constituent elements of the following embodiment include elements that can be easily replaced by persons skilled in the art or that are substantially the same as the elements known by those in the art.

Figure 1:
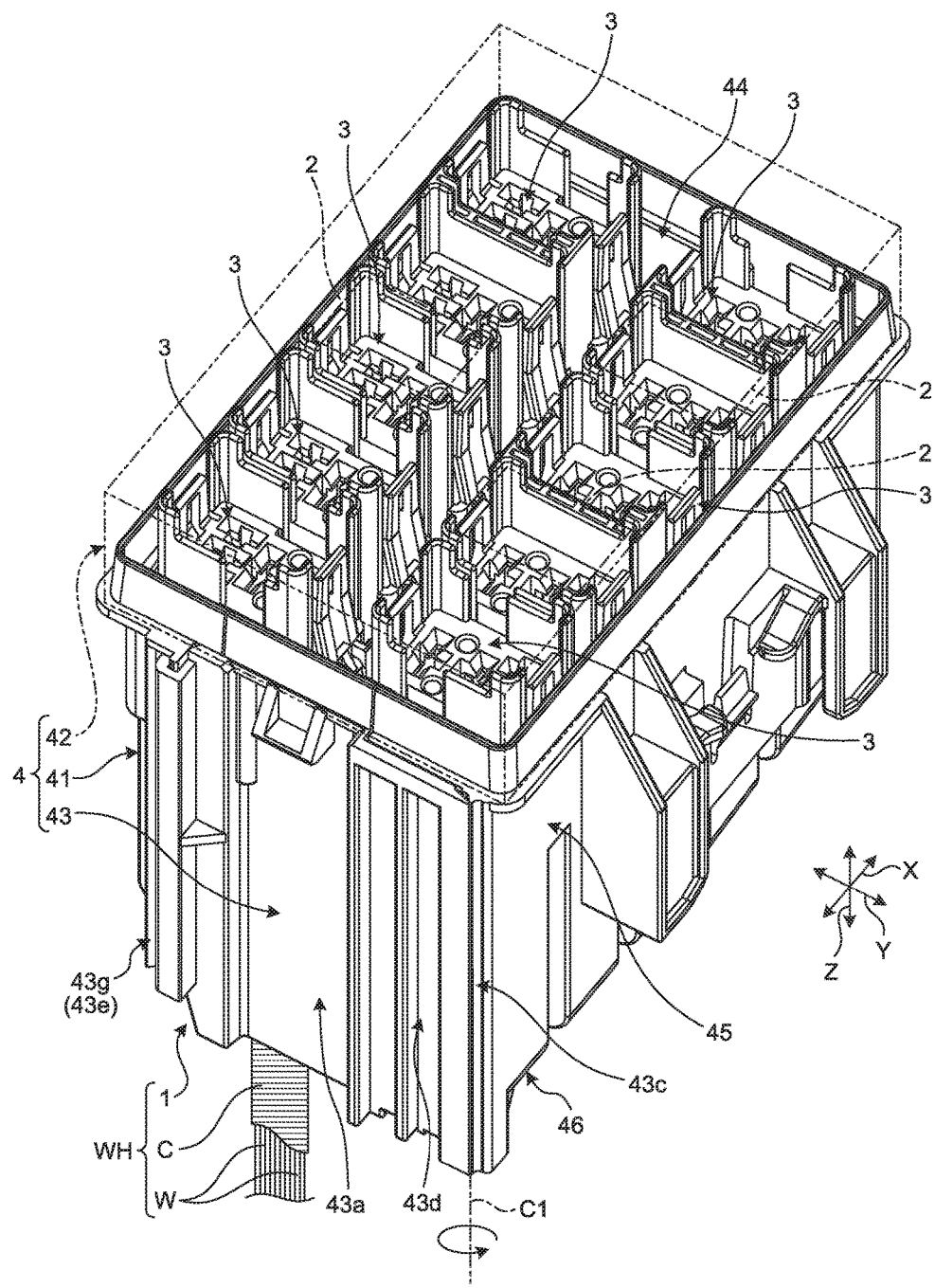
FIG. 1 is a perspective view illustrating a schematic structure of an electrical connection box according to an embodiment.
Figure 2:
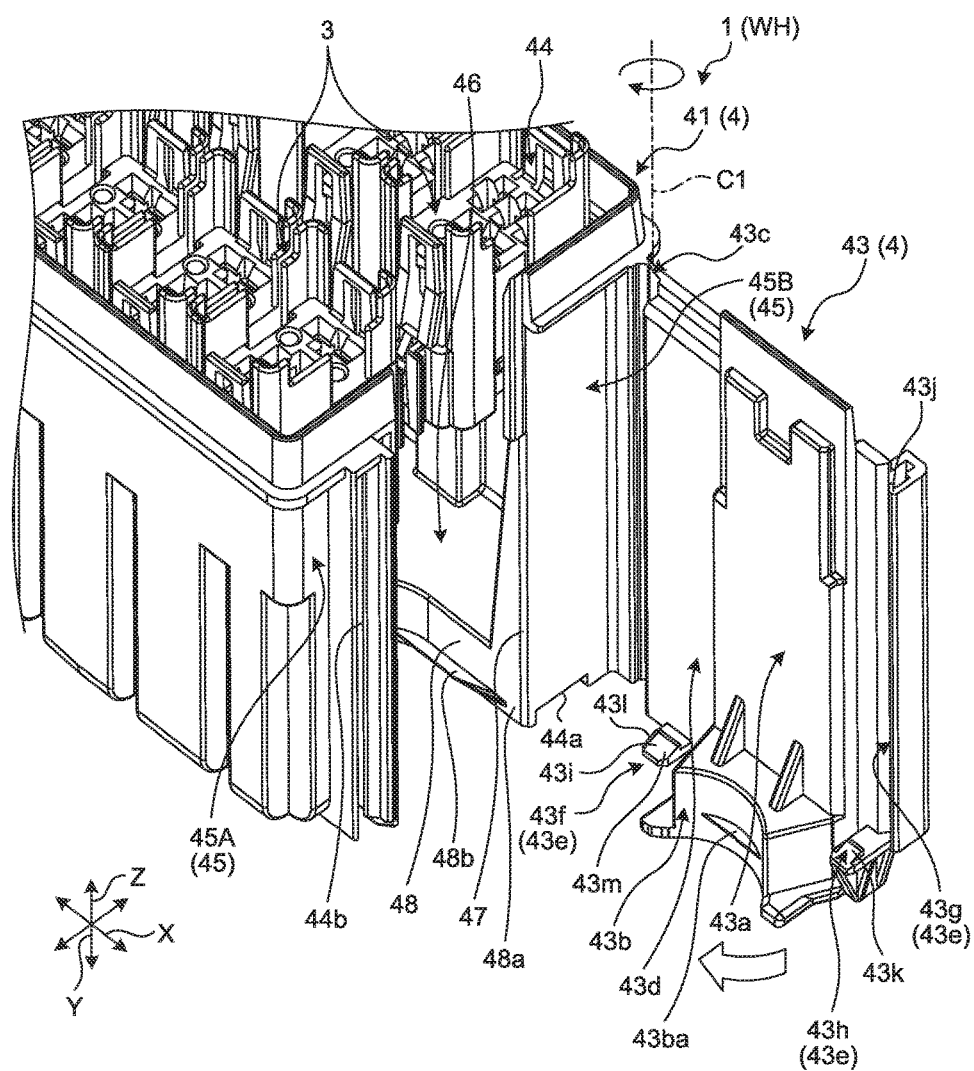
FIG. 2 is a partial perspective view illustrating the schematic structure of the electrical connection box according to the embodiment.
Figure 3:
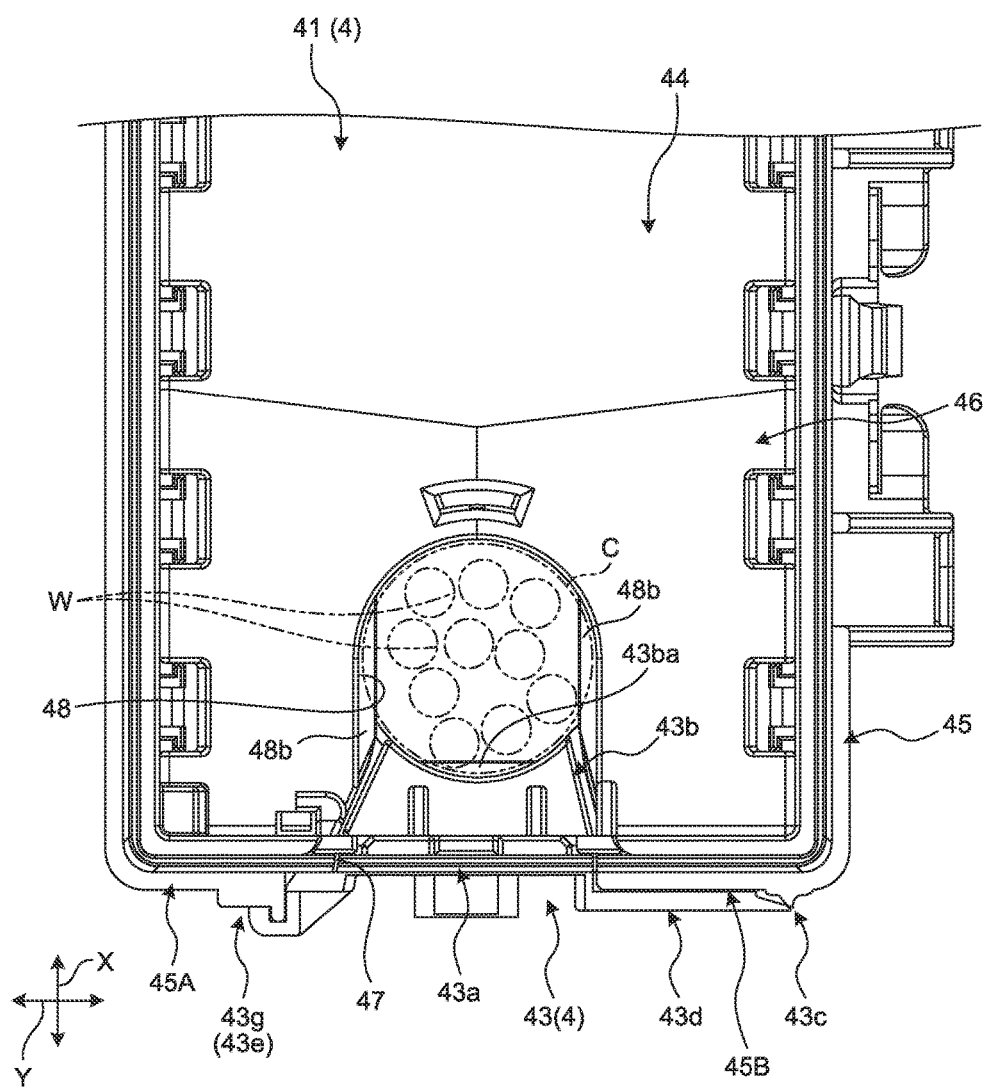
FIG. 3 is a partial plan view illustrating a schematic structure of a lower cover of the electrical connection box according to the embodiment.
Figure 4:
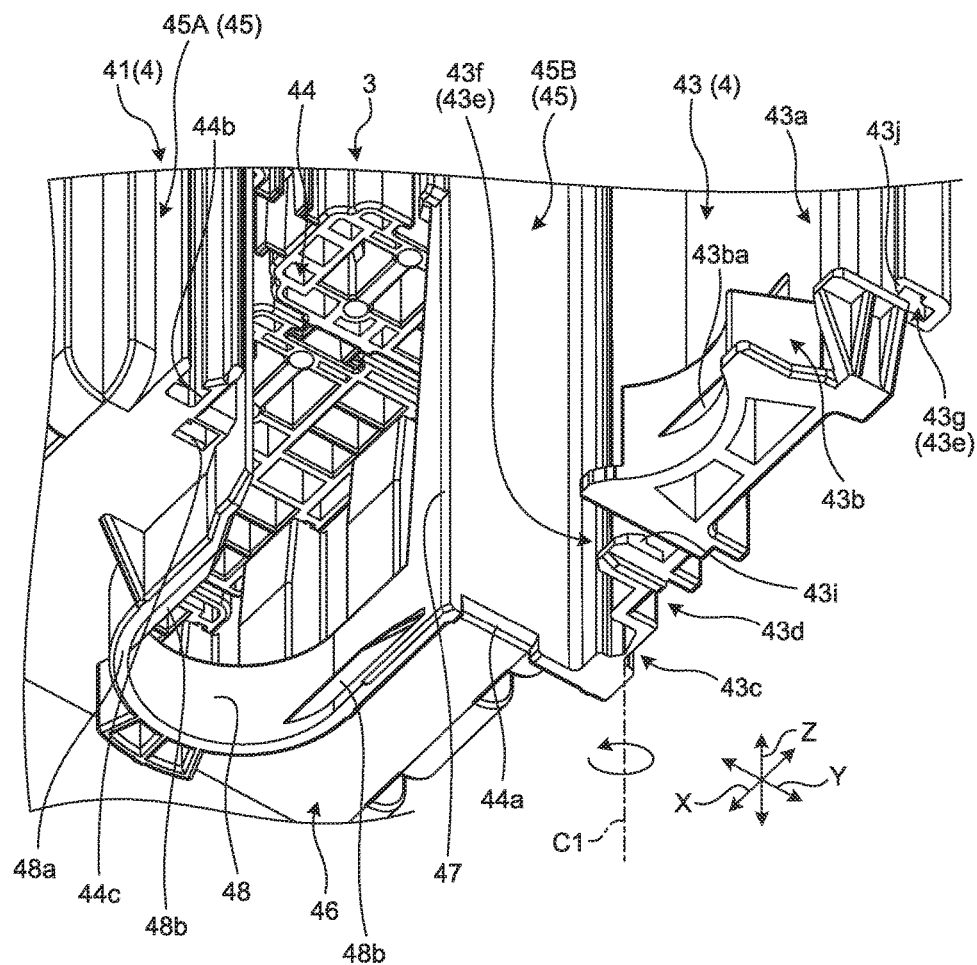
FIG. 4 is a partial perspective view illustrating the electrical connection box including a holding portion according to the embodiment.
Figure 5:
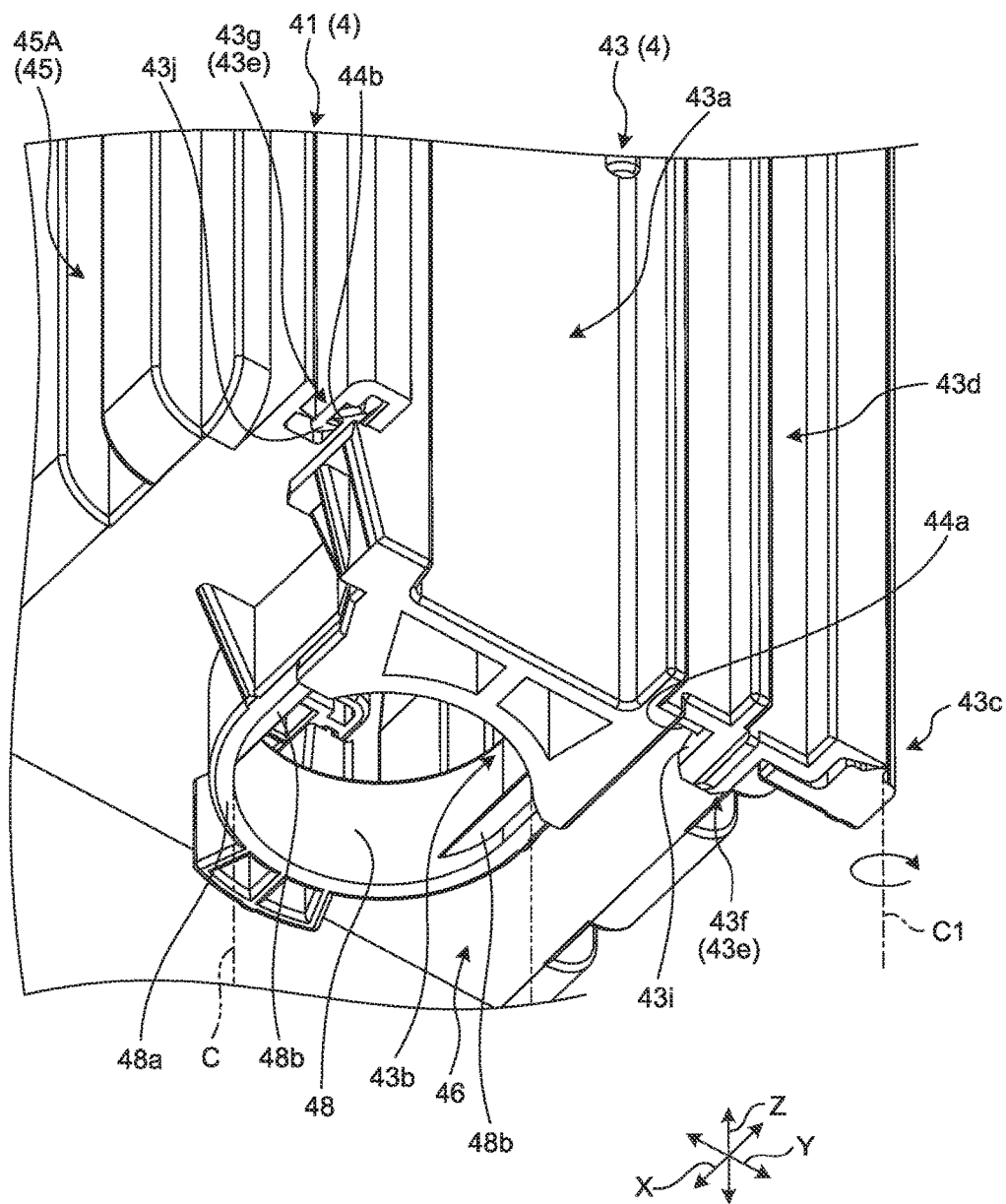
FIG. 5 is a partial perspective view illustrating the electrical connection box including the holding portion according to the embodiment.
Figure 6:
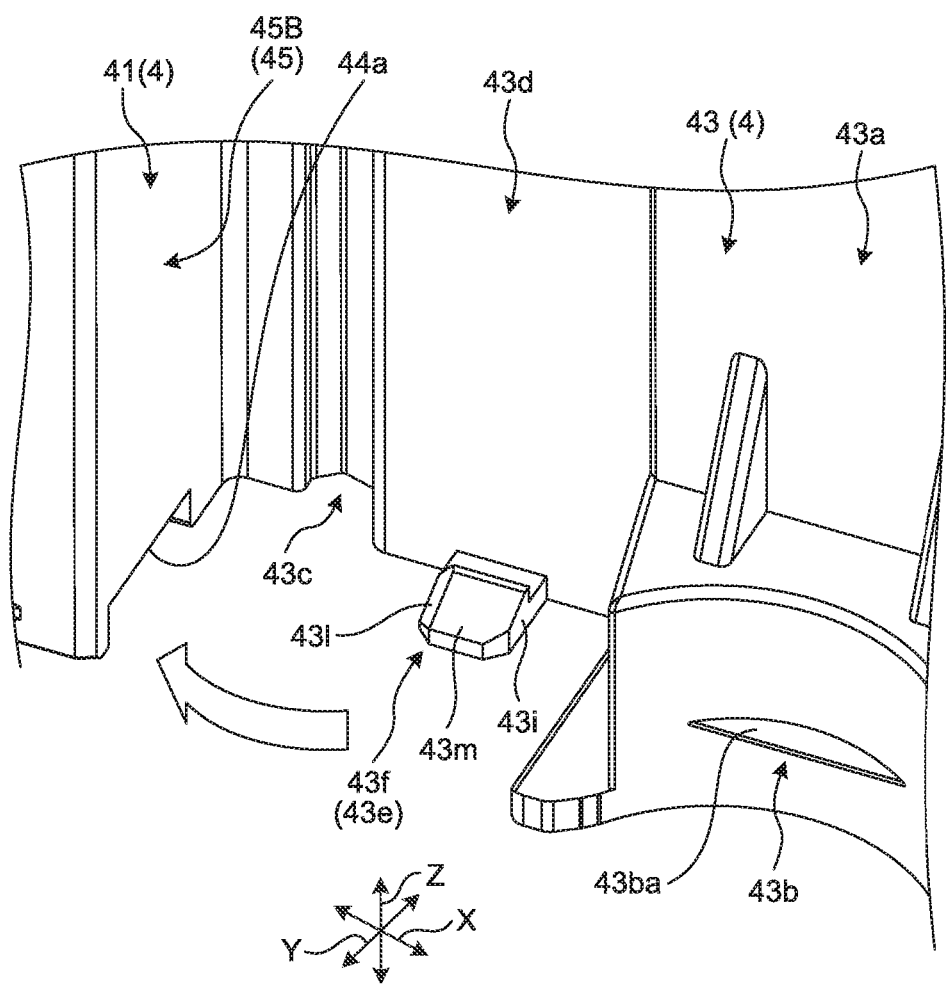
FIG. 6 is a partial perspective view illustrating the electrical connection box including an inside engagement portion according to the embodiment.

In FIG. 1, an upper cover is illustrated with the chain double-dashed line. In the other figures, the upper cover is omitted to be illustrated. In FIG. 1, some of electronic components are each illustrated with the chain double-dashed line. In the other figures, the electronic components are omitted to be illustrated. In FIG. 1, a part of routing materials and a part of an exterior material are partially illustrated. In FIG. 3, a part of the routing materials and a part of the exterior material are each illustrated with the chain double-dashed line. In FIG. 5, a part of the exterior material is illustrated with the chain double-dashed line. In the other figures, the routing materials and the exterior material are omitted to be illustrated. FIGS. 1, 3, and 5 each illustrate a state where a covering member is closed. FIGS. 2, 4, and 6 each illustrate a state where the covering member is open. In the following description, a first direction is described as a "first width direction X", a second direction is described as a "second width direction Y", and a third direction is described as a "height direction Z". The first, second, and third directions are intersected with one another. Specifically, the first width direction X, the second width direction Y, and the height direction Z are perpendicular to one another. In the following description, a side on which the upper cover, which is described later, is disposed in the height direction Z is described as an upper side while a side on which a lower cover, which is described later, is disposed in the height direction Z is described as a lower side in some cases. The respective directions used in the following description are based on a state where an electrical connection box including respective components assembled with one another is mounted on a vehicle unless otherwise stated.

Embodiment

An electrical connection box 1 according to the embodiment illustrated in FIG. 1 is mounted on a vehicle such as an automobile and assembled in a wire harness WH. The wire harness WH bundles a plurality of routing materials W, which are used for power supply and signal communication, as collected parts, and connects the respective routing materials W to respective corresponding devices mounted on the vehicle with connectors interposed therebetween to connect the respective devices to one another, for example. The wire harness WH includes the routing materials W having conductivity, an exterior material C into which the routing materials W are inserted, and the electrical connection box 1 electrically connected to the routing materials W. The routing material W is a metallic bar, an electrical wire, or a bundle of electrical wires, for example. The metallic bar is composed of a conductive bar member and an insulating cover that externally covers the conductive bar member. The electrical wire is composed of a conductor (core wire) formed of a plurality of conductive metallic wires and an insulating cover that externally covers the conductor. The bundle of electrical wires is formed by bundling the electrical wires. The exterior material C, which externally covers and protects the routing materials W, is a corrugated tube formed of an insulating resin material in a substantially cylindrical shape to have flexibility, for example. The wire harness WH bundles the multiple routing materials W and electrically connects the routing materials W to the electrical connection box 1 with terminals or connectors, for example, provided to the ends of the respective bundled routing materials W. The wire harness WH may further include a grommet, a protector, and a fixture, for example.

The electrical connection box 1 collectively houses therein electric components such as connectors, fuses, relays, capacitors, branches, and an electronic control unit. The electrical connection box 1 is disposed inside an engine room or a cabin of the vehicle, for example. The electrical connection box 1 is coupled between a power source such as a battery and various electronic devices mounted inside the vehicle via the routing materials W, for example. The electrical connection box 1 distributes electric power supplied from the power source to the various electronic devices inside the vehicle. The electrical connection box 1 is sometimes called a junction box, a fuse box, or a relay box, for example. In the embodiment, those boxes are collectively called the electrical connection box.

The electrical connection box 1 in the embodiment includes electronic components 2, a plurality of blocks 3, and a housing 4. In the electrical connection box 1, the electronic components 2 having been assembled to the blocks 3 are housed in the housing 4 and electrically connected to the routing materials W. The electronic components 2 are provided in a plural number. Examples of the electronic components 2 include connectors, fuses, relays, capacitors, branches, transistors, an electronic control unit, and an electronic component unit including these parts as a unit. The blocks 3, to which the electronic components 2 are assembled, are assembled to the housing 4 in a detachable manner. The block 3 has a number of cavities. The terminal or the connector provided to the end of the routing material W is fitted to the cavity from the lower side in the height direction Z while the electronic component 2 is fitted to the cavity from the upper side in the height direction Z. The block 3, thus, electrically connects the electronic components 2 and the routing materials W, and holds them. The electronic components 2 having been assembled to the blocks 3 are housed in a housing space 44 in the housing 4. The following describes respective components of the housing 4 of the electrical connection box 1 in detail with reference to the accompanying drawings.

As illustrated in FIGS. 1, 2, and 3, the housing 4 houses the electronic components 2 in the housing space 44, which is a space formed inside thereof. The housing 4 includes a lower cover 41 serving as a housing body, an upper cover 42 serving as a lid member, and a covering member 43. The housing 4 is formed in a substantially rectangular parallelepiped box shape as a whole by combining the lower cover 41, the upper cover 42, and the covering member 43. The housing 4 in the embodiment is formed as a whole in a substantially rectangular parallelepiped box shape in which a long side thereof is in the direction in the first width direction X while a short side thereof is in the direction in the second width direction Y. The housing 4 has a separated two-layer structure in which the lower cover 41 and the upper cover 42 are separated and layered in the height direction Z. In the housing 4, the lower cover 41 and the upper cover 42 are layered in a certain layering direction, which is the height direction Z in this case, and assembled with each other, and define the housing space 44 housing therein the multiple electronic components 2. In the housing 4, the covering member 43 is supported in a rotatable manner with respect to the lower cover 41 and the covering member 43 is capable of closing an opening 47 formed on the lower cover 41. The lower cover 41, the upper cover 42, and the covering member 43 are formed of an insulating synthetic resin. The lower cover 41 and the covering member 43 are integrally formed. The upper cover 42 is formed separately from the lower cover 41 and the covering member 43.

More specifically, the lower cover 41 is the main member that forms the housing space 44 in which the electronic components 2 are assembled. The lower cover 41 is a dish-shaped (tray-shaped) member that has an opening on the upper side in the vertical direction. The lower cover 41 has a side wall 45 and a bottom 46. The lower cover 41 has a hollow formed by the side wall 45 and the bottom 46. The side wall 45, which is formed in a substantially rectangular tubular shape, forms the housing space 44 housing the electronic components 2, for example. The bottom 46 plugs the other opening (opening on the lower side in the height direction Z) formed by the side wall 45. The upper cover 42 is a lid-shaped member that plugs the opening on the upper side in the vertical direction of the lower cover 41. In the housing 4, the upper cover 42 is assembled on the upper side in the height direction Z of the lower cover 41 such that the opening of the lower cover 41 and the upper cover 42 face each other. In the housing 4, the lower cover 41 and the upper cover 42 are engaged with each other by various types of engagement mechanisms. The housing 4 has, inside thereof, the housing space 44 formed by the lower cover 41 and the upper cover 42. The housing space 44 is defined and surrounded by the lower cover 41 and the upper cover 42. Specifically, the housing space 44 is defined by the side wall 45 of the lower cover 41 in the first width direction X and the second width direction Y. The lower side in the height direction Z of the housing space 44 is defined by the bottom 46 of the lower cover 41. The upper side in the height direction Z of the housing space 44 is defined by the upper cover 42. In the electrical connection box 1, the multiple blocks 3 are provided in the housing space 44.

The lower cover 41 has the opening 47 that is formed on the side wall 45 and an insertion hole 48 formed on the bottom 46. The opening 47 and the insertion hole 48 communicate inside and outside the housing space 44. The opening 47 is formed on the side wall 45. The opening 47 is opened and closed by the covering member 43. The opening 47 is formed on a wall portion of the side wall 45 on one side in the first width direction X, i.e., one of the two wall portions in the second width direction Y of the side wall 45, in such a manner that the opening 47 passes through the wall portion in the first width direction X. The opening 47 is formed in a substantially rectangular shape and in such a manner that the opening 47 extends in the height direction Z to pass from the upper edge to the lower edge of the wall portion of the side wall 45 in the height direction Z. The opening 47 is formed on the wall portion of the side wall 45 at an intermediate portion in the second width direction Y. Specifically, the opening 47 is formed such that end wall portions 45A and 45B remain both sides in the second width direction Y as the wall portion of the side wall 45. More specifically, the opening 47 is formed between the end wall portions 45A and 45B of the side wall 45 in the second width direction Y. In the embodiment, the opening 47 is formed at such a position that the length of the end wall portion 45B in the second width direction Y is longer than that of the end wall portion 45A in the second width direction Y on the side wall 45. The insertion hole 48 is formed on the bottom 46. Into the insertion hole 48, the routing materials W assembled to the blocks 3 are inserted. The insertion hole 48 holds the end portion of the exterior material C. The insertion hole 48 is formed on the bottom 46 in such a manner that the insertion hole 48 passes through the bottom 46 in the height direction Z. The insertion hole 48 is formed in a substantially circular shape and communicates with the opening 47. The insertion hole 48 is formed at nearly the same position as the opening 47 in the second width direction Y and formed such that the insertion hole 48 extends toward the opening 47 in the first width direction X to communicate with the opening 47. The inner circumferential surface of the insertion hole 48 extends on the lower side in the height direction Z to form a flange portion 48a (also refer to FIGS. 4 and 5). The inner circumferential surface of the flange portion 48a of the insertion hole 48 is formed in a curved surface shape matched with the outer shape of the exterior material C. On the inner circumferential surface of the flange portion 48a, a plurality of holding ribs 48b are formed. The holding ribs 48b bite ridges and valleys formed on the outer surface of the exterior material C to hold the exterior material C. In the housing 4, the routing materials W assembled to the respective blocks 3 are inserted from outside to inside the housing space 44 through the insertion hole 48, and the respective blocks 3 are assembled to the housing 4, in a state where the opening 47 is open. In the housing 4, the end portion of the exterior material C is held by the holding ribs 48b of the flange portion 48a, and the opening 47 is closed by the covering member 43 while the holding state is kept.

The covering member 43, which is integrally formed with the lower cover 41, is supported in a rotatable manner with respect to the lower cover 41. The covering member 43 closes the opening 47 and holds the end portion of the exterior material C between the covering member 43 and the housing 4. Specifically, the covering member 43 has a lid portion 43a, a holding portion 43b, a supporting portion 43c, an extension portion 43d, and a plurality of engagement portions 43e, all of which are integrally formed with the lower cover 41.

The lid portion 43a is capable of closing the opening 47. The lid portion 43a is formed in a substantially rectangular plate shape having a size enough to cover the opening 47.

The holding portion 43b is formed to protrude from the lid portion 43a. The holding portion 43b fits to the opening 47 and holds the exterior material C between the holding portion 43b and the lower cover 41 in a closed state where the lid portion 43a closes the opening 47. The holding portion 43b is formed to protrude from a rim portion on the lower side in the height direction Z of the lid portion 43a to a side where the opening 47 is positioned in the closed state where the lid portion 43a closes the opening 47. The holding portion 43b is formed at a position where the holding portion 43b fits to the opening 47 and protrudes inside the insertion hole 48 in the closed state where the lid portion 43a closes the opening 47. A protrusion edge surface of the holding portion 43b is formed in a curved surface shape matched with the outer shape of the exterior material C. On the protrusion edge surface, a holding rib 43ba is formed. The holding rib 43ba bites ridges and valleys formed on the outer surface of the exterior material C to hold the exterior material C in the same manner as the holding ribs 48b. In the closed state where the lid portion 43a closes the opening 47, the holding portion 43b fits to the opening 47, faces the flange portion 48a of the insertion hole 48 in the first width direction X, and sandwiches the exterior material C between the holding portion 43b and the flange portion 48a (also refer to FIG. 5). The holding portion 43b holds the exterior material C with the holding ribs 48b and the holding rib 43ba that are interposed therebetween together with the flange portion 48a.

The supporting portion 43c serves as a rotation fulcrum of the rotation of the lid portion 43a with respect to the lower cover 41. The supporting portion 43c in the embodiment is provided at the end portion of the end wall portion 45B of the side wall 45 of the lower cover 41. The supporting portion 43c is formed at the end portion on the side opposite to the opening 47 side of the end wall portion 45B in the second width direction Y. The supporting portion 43c is formed at the end portion of the end wall portion 45B to extend in the height direction Z. The supporting portion 43c is a hinge portion having a rotation axial line C1 in the height direction Z as a rotation center.

The extension portion 43d, which is interposed between the lid portion 43a and the supporting portion 43c, connects the lid portion 43a and the supporting portion 43c such that the holding portion 43b is at a position apart from the supporting portion 43c. The extension portion 43d is formed in a substantially rectangular plate shape in which a length in the height direction Z is equal to that of the lid portion 43a. In other words, the extension portion 43d is formed in a substantially rectangular plate shape having a size nearly equal to that of the end wall portion 45B of the side wall 45. To one end of the extension portion 43d in the direction intersecting the height direction Z and the thickness direction of the extension portion 43d, the lid portion 43a is connected. To the other end of the extension portion 43d in the direction, the supporting portion 43c is connected. The lid portion 43a and the extension portion 43d are, thus, formed continuously, and are formed as a whole in a substantially rectangular plate shape. The extension portion 43d is supported in a rotatable manner with respect to the supporting portion 43c with the rotation axial line C1 serving as the rotation center. This structure, thus, allows the lid portion 43a to be supported in a rotatable manner with respect to the supporting portion 43c with the rotation axial line C1 serving as the rotation center with the extension portion 43d interposed therebetween. In the closed state where the lid portion 43a closes the opening 47, the extension portion 43d is positioned in such a manner that the extension portion 43d faces the end wall portion 45B of the side wall 45 in the first width direction X.

As illustrated in FIGS. 2, 4, and 5, the multiple engagement portions 43e are engaged with the lower cover 41 on both sides of the holding portion 43b in the direction in which the extension portion 43d connects the lid portion 43a and the supporting portion 43c. The direction in which the extension portion 43d connects the lid portion 43a and the supporting portion 43c corresponds to the direction in the second width direction Y in the closed state where the lid portion 43a closes the opening 47. The engagement portions 43e in the embodiment include an inside engagement portion 43f, a first outside engagement portion 43g, and a second outside engagement portion 43h, i.e., three engagement portions.

The inside engagement portion 43f is positioned on the supporting portion 43c side of the holding portion 43b in the direction of the connection performed by the extension portion 43d. The inside engagement portion 43f is provided at the end portion of the extension portion 43d on the lower side in the height direction Z. The inside engagement portion 43f has an engagement claw portion 43i formed to protrude in the protrusion direction of the holding portion 43b. The protrusion direction of the holding portion 43b corresponds to the direction in the first width direction X in the closed state where the lid portion 43a closes the opening 47. The engagement claw portion 43i is formed in a claw shape such that the engagement claw portion 43i protrudes on the end wall portion 45B side of the side wall 45 in the first width direction X, and is engaged with the lower cover 41 in the closed state where the lid portion 43a closes the opening 47. In the embodiment, the engagement claw portion 43i is engaged with an inside stepped-down engagement portion 44a formed at the end portion on the lower side in the height direction Z of the end wall portion 45B of the side wall 45.

The first outside engagement portion 43g and the second outside engagement portion 43h are positioned on the side opposite the supporting portion 43c side of the holding portion 43b in the direction of the connection performed by the extension portion 43d. The first outside engagement portion 43g is provided at the end portion of the lid portion 43a on the side opposite the extension portion 43d side of the lid portion 43a in the direction of the connection performed by the extension portion 43d. The first outside engagement portion 43g is formed at the end portion of the lid portion 43a to extend in the height direction Z. The first outside engagement portion 43g has an engagement claw portion 43j formed to protrude in the protrusion direction of the holding portion 43b. The engagement claw portion 43j is formed to extend in the height direction Z. The engagement claw portion 43j is formed in a claw shape such that the engagement claw portion 43j protrudes on the end wall portion 45A side of the side wall 45 in the first width direction X and is engaged with the lower cover 41 in the closed state where the lid portion 43a closes the opening 47. In the embodiment, the engagement claw portion 43j is engaged with a first outside stepped-down engagement portion 44b that is formed, in the height direction Z, at the end portion of the opening 47 in the second width direction Y on the end wall portion 45A of the side wall 45. The second outside engagement portion 43h is provided at the end portion on the lower side in the height direction Z of the first outside engagement portion 43g. The second outside engagement portion 43h has an engagement claw portion 43k formed to protrude in the protrusion direction of the holding portion 43b. The engagement claw portion 43k is formed in a claw shape such that the engagement claw portion 43k protrudes on the end wall portion 45A side of the side wall 45 in the first width direction X and is engaged with the lower cover 41 in the closed state where the lid portion 43a closes the opening 47. In the embodiment, the engagement claw portion 43k is engaged with a second outside stepped-down engagement portion 44c (particularly referred to FIG. 4) formed at the end portion on the lower side in the height direction Z of the end wall portion 45A of the side wall 45.

As illustrated in FIG. 6, the engagement claw portion 43i of the inside engagement portion 43f in the embodiment has a first tapered surface 43l and a second tapered surface 43m. The first tapered surface 43l and the second tapered surface 43m function as guide surfaces of the engagement claw portion 43i with respect to the inside stepped-down engagement portion 44a. The first tapered surface 43l and the second tapered surface 43m abut the end portion of the inside stepped-down engagement portion 44a with the rotation of the covering member 43 around the rotation axial line C1 serving as the rotation center toward the close position, and guide the engagement claw portion 43i to an engagement position with the inside stepped-down engagement portion 44a. The first tapered surface 431 is provided at the end portion of the engagement claw portion 43i on the supporting portion 43c side in the direction of the connection performed by the extension portion 43d. The first tapered surface 431 is formed as a slanted surface slanted in the direction of the connection performed by the extension portion 43d. The first tapered surface 431 abuts the end portion of the inside stepped-down engagement portion 44a in an initial stage of the rotation of the covering member 43 around the rotation axial line C1 serving as the rotation center toward the close position, and guides the engagement claw portion 43i to the engagement position with the inside stepped-down engagement portion 44a. The second tapered surface 43m is provided at the end portion on the front end side of the engagement claw portion 43i in the protrusion direction of the engagement claw portion 43i. The second tapered surface 43m is formed as a slanted surface slanted in the protrusion direction of the engagement claw portion 43i. The second tapered surface 43m abuts the end portion of the inside stepped-down engagement portion 44a in a last stage of the rotation of the covering member 43 around the rotation axial line C1 serving as the rotation center toward the close position, and guides the engagement claw portion 43i to the engagement position with the inside stepped-down engagement portion 44a.

In the thus-structured electrical connection box 1, first, the routing materials W are assembled to the respective blocks 3, for example. In the state where the opening 47 is open, the respective blocks 3 are, then, housed in the housing space 44 in the housing 4 while the routing materials W are passed through the insertion hole 48, and are assembled to the side wall 45 of the electrical connection box 1. When the end portion of the exterior material C externally covering the routing materials W is disposed to the flange portion 48a of the insertion hole 48 in the electrical connection box 1, the covering member 43 is rotated around the rotation axial line C1 serving as the rotation center while this disposition is kept toward the close position at which the covering member 43 closes the opening 47, and the covering member 43 closes the opening 47. In the electrical connection box 1, in the closed state where the lid portion 43a closes the opening 47, the exterior material C is sandwiched between the holding portion 43b and the flange portion 48a and held with the holding ribs 48b and 43ba interposed therebetween. In the electrical connection box 1, the inside engagement portion 43f is engaged with the inside stepped-down engagement portion 44a, the first outside engagement portion 43g is engaged with the first outside stepped-down engagement portion 44b, and the second outside engagement portion 43h is engaged with the second outside stepped-down engagement portion 44c. As a result, in the closed state where the lid portion 43a closes the opening 47 the electrical connection box 1, the covering member 43 is engaged with the lower cover 41 and the covering member 43 can, thus, cover the opening 47 formed on the lower cover 41.

The electrical connection box 1 and the wire harness WH described above allow the lid portion 43a to close the opening 47 provided on the side wall 45 of the lower cover 41 by rotating the lid portion 43a of the covering member 43 with respect to the lower cover 41 around the supporting portion 43c serving as the rotation fulcrum. In the closed state where the lid portion 43a closes the opening 47 in the electrical connection box 1, the holding portion 43b provided to the lid portion 43a fits to the opening 47 and holds the exterior material C between the holding portion 43b and the lower cover 41. The extension portion 43d, which connects the lid portion 43a and the supporting portion 43c, is interposed between the lid portion 43a and the supporting portion 43c in the electrical connection box 1. The electrical connection box 1, thus, allows the holding portion 43b to be positioned relatively apart from the supporting portion 43c, i.e., allows the holding portion 43b to be positioned relatively apart from the rotation fulcrum. Because of the structure, the electrical connection box 1 allows the radius of the rotation trajectory of the holding portion 43b to be relatively longer when the whole of the covering member 43 is rotated toward the opening 47 along a circular rotation trajectory, thereby allowing the holding portion 43b to fit to the opening 47 along the more straight trajectory. The electrical connection box 1, thus, allows the holding portion 43b to appropriately fit to the opening 47 without interference with the rim portion of the opening 47 and to hold the exterior material C between the holding portion 43b and the lower cover 41. In other words, even when the holding portion 43b is relatively increased in its size so as to reliably hold the exterior material C, for example, the electrical connection box 1 allows the holding portion 43b to appropriately fit to the opening 47 without the interference with the rim portion of the opening 47 and to hold the exterior material C between the holding portion 43b and the lower cover 41. In the electrical connection box 1, the covering member 43 is reliably engaged with the lower cover 41 on both sides of the holding portion 43b with the multiple engagement portions 43e. As a result, the electrical connection box 1 and the wire harness WH allow the covering member 43 to appropriately cover the opening 47 even in the state where the exterior material C of the routing materials W is held between the lower cover 41 and the covering member 43. The electrical connection box 1 and the wire harness WH, thus, allow the holding portion 43b to appropriately hold the exterior material C, thereby making it possible to reliably achieve a water stopping performance at the holding portion 43b, for example.

In the electrical connection box 1 and the wire harness WH, the inside engagement portion 43f, which is positioned on the supporting portion 43c side of the holding portion 43b, has the engagement claw portion 43i that is engaged with the side wall 45 and formed to have the first tapered surface 431 and the second tapered surface 43m. Because of this structure in the electrical connection box 1, the first tapered surface 431 guides the engagement claw portion 43i toward the engagement position with the inside stepped-down engagement portion 44a in an initial stage of the rotation of the covering member 43 around the rotation axial line C1 serving as the rotation center toward the close position. Thereafter, in the last stage of the rotation, the second tapered surface 43m guides the engagement claw portion 43i toward the engagement position with the inside stepped-down engagement portion 44a. The electrical connection box 1 allows the first tapered surface 431 and the second tapered surface 43m to guide the engagement claw portion 43i toward the engagement position with the inside stepped-down engagement portion 44a step by step with the rotation of the covering member 43 toward the close position. As a result, the electrical connection box 1 can guide the covering member 43 smoothly to the close position and smoothly achieve the closed state where the lid portion 43a closes the opening 47. The electrical connection box 1 can, thus, improve workability in covering the opening 47 by the covering member 43.

In the electrical connection box 1 and the wire harness WH, the extension portion 43d positioned in such a manner that the extension portion 43d faces the end wall portion 45B of the side wall 45 and the inside engagement portion 43f provided to the extension portion 43d is engaged with the end wall portion 45B in the closed state where the lid portion 43a closes the opening 47. Because of this structure, the electrical connection box 1 allows the extension portion 43d to be reliably engaged with the end wall portion 45B of the side wall 45 with the inside engagement portion 43f. As a result, the electrical connection box 1 can reliably prevent the covering member 43 from coming off from the extension portion 43d to the side where the covering member 43 is open in the closed state where the lid portion 43a closes the opening 47. The electrical connection box 1 and the wire harness WH, thus, allow the covering member 43 to appropriately cover the opening 47.

The electrical connection box and the wire harness according to the embodiment of the invention are not limited to those described above, and can be changed in various ways within the scopes of the claims.

In the embodiment, the engagement claw portion 43i has the first tapered surface 43l and the second tapered surface 43m. The structure is not limited to this example. In the embodiment, the inside engagement portion 43f is provided to the extension portion 43d. The structure is not limited to this example. In the embodiment, the engagement portions 43e include the first outside engagement portion 43g and the second outside engagement portion 43h. The structure is not limited to this example. Any one of the first outside engagement portion 43g and the second outside engagement portion 43h may be included.

In the embodiment, the electrical connection box 1 is applied to the wire harness WH for vehicle use as an example. The application of the electrical connection box 1 is not limited to the example.

In the embodiment, the housing 4 has a separated two-layer structure in which the lower cover 41 and the upper cover 42 are separated. The housing 4 is not limited to have the separated two-layer structure. For example, the housing 4 may have a separated three-layer structure.

The electrical connection box and the wire harness according to the embodiment allow the lid portion to close the opening provided on the wall of the housing body by rotating the lid portion of the covering member to the housing body around the supporting portion serving as the rotation fulcrum. In the closed state where the lid portion closes the opening in the electrical connection box, the holding portion provided to the lid portion fits to the opening and holds, between the holding portion and the housing body, the exterior material of the routing materials electrically connected to the electronic components. The extension portion that connects the lid portion and the supporting portion is interposed between the lid portion and the supporting portion in the electrical connection box. The electrical connection box, thus, allows the holding portion to be positioned relatively apart from the supporting portion, i.e., the holding portion to be positioned relatively apart from the rotation fulcrum. Because of the structure, the electrical connection box allows the radius of the rotation trajectory of the holding portion to be relatively longer when the whole of the covering member is rotated toward the opening along a circular rotation trajectory, thereby allowing the holding portion to fit to the opening along the more straight trajectory. The electrical connection box, thus, allows the holding portion to appropriately fit to the opening and the exterior material to be held between the holding portion and the housing body. The electrical connection box allows the covering member to be reliably engaged with the housing body on both sides of the holding portion by the multiple engagement portions. The electrical connection box and the wire harness have an advantageous effect of allowing the covering member to appropriately cover the opening even in the state where the exterior material of the routing materials is held between the housing body and the covering member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electrical connection box, comprising:
a housing body including:
  a wall forming a housing space housing therein an electronic component; and
  an opening formed on the wall and communicating inside and outside the housing space; and
a covering member including:
  a lid portion capable of closing the opening;
  a holding portion that is formed to protrude from the lid portion, and, in a closed state where the lid portion closes the opening, fits to the opening and holds, between the holding portion and the housing body, an exterior material of a routing material electrically connected to the electronic component;
  a supporting portion serving as a rotation fulcrum of the lid portion with respect to the housing body;
  an extension portion that is interposed between the lid portion and the supporting portion and connects the lid portion and the supporting portion such that the holding portion is at a position apart from the supporting portion; and
  a plurality of engagement portions engaged with the housing body on both sides of the holding portion in a connection direction in which the extension portion connects the lid portion and the supporting portion.

2. The electrical connection box according to claim 1, wherein
the engagement portions include an inside engagement portion positioned on the supporting portion side of the holding portion in the connection direction,
the inside engagement portion has an engagement claw portion that is formed to protrude in a protrusion direction of the holding portion, and is engaged with the wall, and
the engagement claw portion has a first tapered surface that is provided at an end portion thereof on the supporting portion side in the connection direction and is slanted in the connection direction, and a second tapered surface that is provided at an end portion thereof on a front end side in the protrusion direction and is slanted in the protrusion direction.

3. The electrical connection box according to claim 2, wherein
the extension portion faces the wall in the closed state where the lid portion closes the opening, and
the inside engagement portion is provided to the extension portion.

4. A wire harness, comprising:
a conductive routing material;
an exterior material externally covering the routing material; and
an electrical connection box electrically connected to the routing material, wherein
the electrical connection box includes:
  a housing body including:

a wall forming a housing space housing therein an electronic component electrically connected to the routing material; and an opening formed on the wall and communicating inside and outside the housing space; and a covering member including:

a lid portion capable of closing the opening;

a holding portion that is formed to protrude from the lid portion, and, in a closed state where the lid portion closes the opening, fits to the opening and holds the exterior material between the holding portion and the housing body;

a supporting portion serving as a rotation fulcrum of the lid portion with respect to the housing body;

an extension portion that is interposed between the lid portion and the supporting portion and connects the lid portion and the supporting portion such that the holding portion is at a position apart from the supporting portion; and a plurality of engagement portions engaged with the housing body on both sides of the holding portion in a connection direction in which the extension portion connects the lid portion and the supporting portion.

* * * * *